US011245680B2

(12) United States Patent
Wallrabenstein

(10) Patent No.: US 11,245,680 B2
(45) Date of Patent: Feb. 8, 2022

(54) GARBLED CIRCUIT FOR DEVICE AUTHENTICATION

(71) Applicant: Analog Devices, Inc., Wilmington, MA (US)

(72) Inventor: John Ross Wallrabenstein, West Lafayette, IN (US)

(73) Assignee: Analog Devices, Inc., Wilmington, MA (US)

(*) Notice: Subject to any disclaimer, the term of this patent is extended or adjusted under 35 U.S.C. 154(b) by 354 days.

(21) Appl. No.: 16/290,156

(22) Filed: Mar. 1, 2019

(65) Prior Publication Data

US 2020/0280551 A1 Sep. 3, 2020

(51) Int. Cl.
*H04L 29/06* (2006.01)
*H04L 9/08* (2006.01)

(52) U.S. Cl.
CPC ............ *H04L 63/08* (2013.01); *H04L 9/0861* (2013.01); *H04L 63/10* (2013.01); *H04L 2463/062* (2013.01)

(58) Field of Classification Search
CPC ....... H04L 63/08; H04L 9/0861; H04L 63/10; H04L 2463/062; H04L 9/3278; H04L 2209/46; H04L 63/0428; H04L 2209/16; H04L 9/0866; G09C 1/00
See application file for complete search history.

(56) References Cited

U.S. PATENT DOCUMENTS

| 6,714,120 B2 | 3/2004 | Blama et al. |
| 6,834,272 B1* | 12/2004 | Naor .................. G06Q 20/0855 380/255 |
| 8,515,058 B1* | 8/2013 | Gentry .................. H04L 9/008 380/28 |
| 8,705,873 B2 | 4/2014 | Voloshynovskiy et al. |

(Continued)

FOREIGN PATENT DOCUMENTS

| CN | 103888266 A | 6/2014 |
| CN | 105978694 A | 9/2016 |

(Continued)

OTHER PUBLICATIONS

PCT/US2019/029077, Sep. 22, 2019, International Search Report and Written Opinion.

(Continued)

*Primary Examiner* — Aravind K Moorthy
(74) *Attorney, Agent, or Firm* — Wolf, Greenfield & Sacks, P.C.

(57) ABSTRACT

This application describes systems and methods for using a garbled circuit and a physical unclonable function (PUF) value to authenticate a device. During enrollment, the device and at least one computer collaboratively construct multiple garbled circuits corresponding to bits of an enrollment PUF value generated by PUF circuitry coupled to the device. During authentication, the device and at least one computer evaluate the multiple garbled circuits using an authentication PUF value. Using the results of this evaluation, the at least one computer compares the enrollment PUF value with the (Continued)

authentication PUF value and determines a distance between them. The at least one computer may authenticate the device when the calculated distance is less than a threshold value.

20 Claims, 9 Drawing Sheets

(56) References Cited

U.S. PATENT DOCUMENTS

| | | | |
|---|---|---|---|
| 8,762,723 B2 | 6/2014 | Yu et al. | |
| 8,762,736 B1* | 6/2014 | Goldwasser | G06F 21/556 |
| | | | 713/189 |
| 9,071,598 B2 | 6/2015 | Ramzan et al. | |
| 9,225,512 B1 | 12/2015 | Trimberger | |
| 9,276,739 B2 | 3/2016 | Celik et al. | |
| 9,401,804 B2 | 7/2016 | Kolesnikov et al. | |
| 9,571,276 B2 | 2/2017 | Falk et al. | |
| 9,729,525 B1* | 8/2017 | Kolman | G06F 21/6227 |
| 9,906,511 B1* | 2/2018 | Kolman | H04L 9/3242 |
| 9,917,820 B1* | 3/2018 | Kolman | G06F 21/6227 |
| 9,991,892 B2 | 6/2018 | Wacquez et al. | |
| 10,178,090 B2* | 1/2019 | Pe'er | H04L 9/0894 |
| 10,749,694 B2 | 8/2020 | Adams et al. | |
| 2003/0041265 A1* | 2/2003 | Lagimonier | H04W 12/121 |
| | | | 726/4 |
| 2009/0175443 A1* | 7/2009 | Kolesnikov | H04L 9/06 |
| | | | 380/44 |
| 2009/0282259 A1* | 11/2009 | Skoric | G06Q 20/40975 |
| | | | 713/185 |
| 2009/0310516 A1* | 12/2009 | Goel | H04L 45/16 |
| | | | 370/254 |
| 2011/0110525 A1* | 5/2011 | Gentry | H04L 9/14 |
| | | | 380/285 |
| 2011/0211692 A1* | 9/2011 | Raykova | H04L 9/3218 |
| | | | 380/46 |
| 2011/0215829 A1 | 9/2011 | Guajardo Merchan et al. | |
| 2011/0216902 A1* | 9/2011 | Kolesnikov | H04L 9/0631 |
| | | | 380/47 |
| 2012/0070000 A1* | 3/2012 | Baechler | H04L 9/3218 |
| | | | 380/255 |
| 2012/0079602 A1* | 3/2012 | Kolesnikov | H04L 9/0662 |
| | | | 726/26 |
| 2012/0183135 A1 | 7/2012 | Paral et al. | |
| 2012/0233460 A1* | 9/2012 | Kamara | H04L 9/3218 |
| | | | 713/168 |
| 2013/0010957 A1 | 1/2013 | Yu et al. | |
| 2014/0040614 A1* | 2/2014 | Kolesnikov | H04L 9/085 |
| | | | 713/164 |
| 2014/0068780 A1* | 3/2014 | Kim | G06F 21/88 |
| | | | 726/26 |
| 2014/0091832 A1 | 4/2014 | Gotze et al. | |
| 2014/0093074 A1 | 4/2014 | Gotze et al. | |
| 2014/0095861 A1* | 4/2014 | Kolesnikov | H04L 9/32 |
| | | | 713/151 |
| 2014/0105393 A1* | 4/2014 | Kolesnikov | H04L 9/3218 |
| | | | 380/255 |
| 2014/0140513 A1 | 5/2014 | BrightSky et al. | |
| 2014/0189890 A1 | 7/2014 | Koeberl et al. | |
| 2014/0325237 A1 | 10/2014 | Van der Leest et al. | |
| 2014/0372769 A1* | 12/2014 | Kerschbaum | H04L 9/008 |
| | | | 713/189 |
| 2015/0101037 A1 | 4/2015 | Yang et al. | |
| 2015/0163211 A1 | 6/2015 | Chellappa et al. | |
| 2015/0278527 A1 | 10/2015 | Falk | |
| 2015/0278551 A1 | 10/2015 | Iyer et al. | |
| 2015/0341326 A1* | 11/2015 | Premnath | H04L 63/062 |
| | | | 713/171 |
| 2015/0349958 A1 | 12/2015 | Lindell | |
| 2015/0381349 A1* | 12/2015 | Nikolaenko | G09C 1/00 |
| | | | 713/189 |
| 2016/0004874 A1* | 1/2016 | Ioannidis | G06F 17/16 |
| | | | 713/165 |
| 2016/0044031 A1* | 2/2016 | Kolesnikov | H04L 9/3218 |
| | | | 713/170 |
| 2016/0050070 A1* | 2/2016 | Bohli | H04L 9/083 |
| | | | 713/168 |
| 2016/0156476 A1 | 6/2016 | Lee et al. | |
| 2016/0182045 A1 | 6/2016 | Mai et al. | |
| 2016/0196436 A1* | 7/2016 | Kennedy | G06F 21/602 |
| | | | 713/189 |
| 2016/0204781 A1 | 7/2016 | Plusquellic et al. | |
| 2016/0255154 A1 | 9/2016 | Kim et al. | |
| 2017/0126415 A1 | 5/2017 | Deyati et al. | |
| 2017/0163421 A1* | 6/2017 | Chase | G09C 1/00 |
| 2017/0178710 A1 | 6/2017 | Augustine et al. | |
| 2017/0359321 A1* | 12/2017 | Rindal | G06Q 30/08 |
| 2017/0366338 A1* | 12/2017 | Gajek | H04L 9/008 |
| 2018/0006813 A1 | 1/2018 | Van der Leest et al. | |
| 2018/0013779 A1 | 1/2018 | Aguayo Gonzalez et al. | |
| 2018/0019997 A1* | 1/2018 | Chabanne | H04L 63/0861 |
| 2018/0091300 A1* | 3/2018 | Tomishima | G11C 29/50 |
| 2018/0096172 A1* | 4/2018 | Lu | G06F 21/86 |
| 2018/0131512 A1* | 5/2018 | Gajek | H04L 9/008 |
| 2018/0204284 A1* | 7/2018 | Cerezo Sanchez | G06Q 40/06 |
| 2018/0240100 A1* | 8/2018 | Leleu | G09C 1/04 |
| 2018/0248545 A1* | 8/2018 | Bar | E05F 15/73 |
| 2018/0359082 A1* | 12/2018 | Bos | H04L 9/30 |
| 2019/0026724 A1* | 1/2019 | Wade | H04L 9/0866 |
| 2019/0028284 A1* | 1/2019 | Rezayee | H04L 9/3278 |
| 2019/0042788 A1* | 2/2019 | Cho | H04W 4/024 |
| 2019/0044708 A1* | 2/2019 | Dewan | G06F 21/85 |
| 2019/0065759 A1* | 2/2019 | Pitel | H04L 9/0618 |
| 2019/0068190 A1 | 2/2019 | Karpinskyy et al. | |
| 2019/0097818 A1* | 3/2019 | Lu | H04L 9/3263 |
| 2019/0165954 A1* | 5/2019 | Lu | H04L 63/0457 |
| 2019/0165955 A1* | 5/2019 | Wu | H01L 29/42328 |
| 2019/0165957 A1* | 5/2019 | Abbott | G06F 21/44 |
| 2019/0207775 A1* | 7/2019 | Nishimae | H04L 9/0891 |
| 2019/0228164 A1* | 7/2019 | Shen | G06F 21/72 |
| 2019/0238519 A1* | 8/2019 | Bikumala | H04L 9/16 |
| 2019/0253417 A1* | 8/2019 | Kim | G06F 21/74 |
| 2019/0260737 A1* | 8/2019 | Brown | G06Q 20/40145 |
| 2019/0305927 A1* | 10/2019 | Bhunia | H03K 19/17764 |
| 2019/0334882 A1* | 10/2019 | Mondello | H04L 9/0866 |
| 2019/0342104 A1* | 11/2019 | Adams | H04L 9/0822 |
| 2019/0342105 A1* | 11/2019 | Adams | H04L 9/3278 |
| 2019/0385489 A1* | 12/2019 | Norrman | G09C 1/00 |
| 2020/0029208 A1* | 1/2020 | Winoto | H04L 9/3278 |
| 2020/0052912 A1* | 2/2020 | Lu | H04L 9/30 |
| 2020/0053061 A1* | 2/2020 | Cambou | H04L 63/0457 |
| 2020/0106626 A1* | 4/2020 | Wallrabenstein | G06F 21/75 |
| 2020/0151356 A1* | 5/2020 | Rohloff | G06F 21/6227 |
| 2020/0159965 A1* | 5/2020 | Norem | H04L 9/3268 |
| 2020/0175201 A1* | 6/2020 | Kramer | G06F 21/6254 |
| 2020/0184114 A1* | 6/2020 | Leiserson | G06F 21/74 |
| 2020/0195446 A1* | 6/2020 | Lepoint | H04L 63/0435 |
| 2020/0213281 A1* | 7/2020 | Mondello | H04L 9/002 |
| 2020/0242466 A1* | 7/2020 | Mohassel | G06F 21/6254 |
| 2020/0259651 A1* | 8/2020 | Mohassel | H04L 9/0618 |
| 2020/0311725 A1* | 10/2020 | Savolainen | G06Q 20/22 |
| 2020/0344075 A1* | 10/2020 | Gremaud | H04L 9/0825 |
| 2020/0372128 A1* | 11/2020 | Torres | H04L 9/3263 |
| 2020/0389304 A1* | 12/2020 | Gryb | G06F 21/6218 |
| 2020/0412528 A1* | 12/2020 | Saint | H04L 63/126 |
| 2021/0012008 A1* | 1/2021 | Kim | H04L 9/0897 |
| 2021/0075628 A1* | 3/2021 | Bean | H04L 9/3278 |

FOREIGN PATENT DOCUMENTS

| | | |
|---|---|---|
| CN | 106874799 A | 6/2017 |
| EP | 2 302 555 B1 | 10/2016 |
| WO | WO 2007/072450 A2 | 6/2007 |
| WO | WO 2017/123631 A1 | 7/2017 |

OTHER PUBLICATIONS

U.S. Appl. No. 15/968,513, filed May 1, 2018, Adams et al.
U.S. Appl. No. 15/968,496, filed May 1, 2018, Adams et al.
PCT/US2019/029077, Nov. 12, 2020, International Preliminary Report on Patentability.

(56) References Cited

OTHER PUBLICATIONS

Alam et al., Secure policy execution using reusable garbled circuit in the cloud. Future Generation Computer Systems. 2018: 87:488-501.

Bellare et al., Foundations of Garbled Circuits. ACM Conference on Computer and Communications Security. Oct. 1, 2012; 45 pages.

Devadas et al., Design and Implementation of PUF-Based "Unclonable" RFID ICs for Anti-Counterfeiting and Security Applications. 2008 IEEE International Conference on RFID. IEEE. Apr. 16-17, 2008: pp. 58-64.

Goldwasser et al., Reusable Garbled Circuits and Succinct Functional Encryption. STOC. 2013; 1-10.

Maiti et al., The impact of aging on an FPGA-based Physical Unclonable Function. 2011 21st International Conference on Field Programmable Logic and Applications (FPL). IEEE. 2011:151-156.

Rostami et al. Robust and Reverse-Engineering Resilient PUF Authentication and Key-Exchange by Substring Matching. IEEE Transactions on Emerging Topics in Computing. May 7, 2014;2(1):37-49.

International Search Report and Written Opinion dated Sep. 22, 2019 in connection with International Application No. PCT/US2019/029077.

Hussain et al., SHAIP: Secure Hamming Distance for Authentication of Intrinsic PUFs. ACM Transactions on Design Automation of Electronic Systems. Dec. 31, 2018: 23(6): Article 75. Retrieved from the Internet: <htpp://www.aceslab.org/sites/default/files/SHAIP.pdf>.

International Preliminary Report on Patentability dated Nov. 11, 2020 in connection with International Application No. PCT/US2019/029077.

\* cited by examiner

GARBLED CIRCUIT FOR DEVICE AUTHENTICATION

FIELD OF THE DISCLOSURE

The present disclosure relates to techniques for authenticating devices using garbled circuits and physical unclonable functions.

BACKGROUND

Devices may need to be authenticated to access resources provided by other devices, such as databases or application servers. Authentication may ensure the actual identity of a device, allowing enforcement of rules governing access to resources.

Garbled circuits are a cryptographic technique that allows for two or more parties to securely compute a function. A physical unclonable function (PUF) includes circuitry configured to generate an output whose value depends on unique physical properties of the circuitry. Even tightly controlled manufacturing processes will include variations. Thus, even when circuit components are intended to have identical characteristics, these variations result in circuit components with unique characteristics.

SUMMARY OF THE DISCLOSURE

According to various aspects, systems and methods are provided for using a garbled circuit and a physical unclonable function (PUF) value to authenticate a device. During enrollment, the device and at least one computer collaboratively construct multiple garbled circuits corresponding to bits of an enrollment PUF value generated by PUF circuitry coupled to the device. During authentication, the device and the at least one computer evaluate the multiple garbled circuits using an authentication PUF value. Using the results of this evaluation, the at least one computer compares the enrollment PUF value with the authentication PUF value and determines a distance between them. The at least one computer may authenticate the device when the calculated distance is less than a threshold value.

According to one aspect of the present application, a device is provided. The device includes processing circuitry configured to perform acts. The acts include obtaining a physically unclonable function (PUF) value comprising a plurality of bits representing a digitized value of a signal generated by PUF circuitry coupled to the device providing, using at least one communication network, the PUF value to at least one computer; and for each one bit of multiple bits in the plurality of bits: receiving, from the at least one computer using the at least one communication network, first and second input values for a garbled circuit corresponding to the each one bit, wherein the first input value corresponds to a bit value of zero and the second input value corresponds to a bit value of one; encrypting the first and second input values using a device key associated with the device to generate respective encrypted input entries; and providing the encrypted entries to the at least one computer using the at least one communication network.

In some embodiments, the first input value and the second input value may each comprise a symmetric key. The device key associated with the device may comprise a symmetric key. The digitized value of the signal generated by the PUF circuitry may depend on physical characteristics of the PUF circuitry. The PUF circuitry may include a plurality of PUF circuits, and obtaining the PUF value may include selecting from a plurality of signals generated by the plurality of PUF circuits. The device may include one or more sensors; one or more Internet of Things appliances; and/or one or more components, such as one or more Application Specific Integrated Circuits; one or more Field-Programmable Gate Arrays; one or more processors (e.g., processors configured for use with mobile devices, such as, for example, ARM Cortex-M Processors); one or more Micro-Electro-Mechanical Systems; one or more Analog to Digital Converters; one or more Radio-Frequency Identification Tags; and/or one or more Near Field Communications Tags.

According to one aspect of the present application, at least one computer is provided. The at least one computer includes processing circuitry configured to perform acts. The acts include receiving, from a device using at least one communication network, a physically unclonable function (PUF) value comprising a plurality of bits representing a digitized value of a signal generated by PUF circuitry coupled to the device; and for each one bit of multiple bits in the plurality of bits: creating input values and encrypted output entries for a garbled circuit corresponding to the each one bit; providing, to the device and using the at least one communication network, the input values; receiving, from the device using the at least one communication network, input entries for the garbled circuit, each input entry comprising one of the input values encrypted with a device key associated with the device; and storing the input entries in association with the encrypted output entries for the garbled circuit.

In some embodiments, the input values comprise a first input value and a second input value; creating the first input value may include generating a first symmetric key; and creating the second input value may include generating a second symmetric key. Receiving the input entries for the garbled circuit may include receiving a first input entry and a second entry. The first input entry may include a first symmetric key encrypted with the device key associated with the device. The second input entry may include a second symmetric key encrypted with the device key associated with the device. Creating the encrypted output entries for the garbled circuit corresponding to the each one bit may include generating a first value corresponding to zero and a second value corresponding to one; encrypting the first value with a computer key associated with the at least one computer to generate a first output entry and the second value with the computer key associated with the at least one computer to generate a second output entry; and encrypting the first output entry with a first input key to generate the encrypted first output entry and the second output entry with a second input key to generate the encrypted second output entry. Generating the first value may include evaluating a function of zero and a value of the each one bit. Generating the second value may include evaluating a function of one and a value of the each one bit. Generating the first value may include combining a distance value with a device identifier. Generating the first value may include combining a distance value with a nonce. The processing circuitry is configured to further perform acts of: deleting the first input key after generating the encrypted first output entries for the garbled circuits corresponding to the multiple bits; deleting the second input key after generating the encrypted second output entries for the garbled circuits corresponding to the multiple bits; and deleting the PUF value after generating the first values and the second values for the garbled circuits corresponding to the multiple bits. The garbled circuit corresponding to the each one bit may have a depth of one.

In some embodiments, creating encrypted output entries for the garbled circuit may include: generating a first symmetric key and a second symmetric key; generating a first distance value by performing a logical XOR of the value zero and a value of the each one bit; generating a second distance value by performing a logical XOR of the value one and the value of the each one bit; generating a first output value by concatenating the first distance, an identifier of the device, and a nonce; generating a second output value by concatenating the second distance, the identifier of the device, and the nonce; generating a first output entry by encrypting the first output value using a computer key associated with the at least one computer; generating a second output entry by encrypting the second output value using the computer key associated with the at least one computer; generating a first encrypted output entry by encrypting the first output entry using the first symmetric key; and generating a second encrypted output entry by encrypting the second output entry using the second symmetric key.

According to one aspect of the present application, a device is provided. The device includes processing circuitry configured to perform acts. The acts include processing circuitry configured to perform: obtaining a physically unclonable function (PUF) value comprising a plurality of bits representing a digitized value of a signal generated by PUF circuitry coupled to the device; and for each one bit of multiple bits in the plurality of bits: receiving, from at least one computer using at least one communication network, garbled circuit entries for a garbled circuit corresponding to the each one bit, each of the garbled circuit entries comprising respective input and encrypted output entries; selecting, from among the received garbled circuit entries, a first garbled circuit entry based on a value of the each one bit, the first garbled circuit entry including a first input entry and a first encrypted output entry; generating a first input key by decrypting the first input entry using a device key associated with the device; generating a first output entry by decrypting, using the first input key, the first encrypted output entry; and providing the first output entry to the at least one computer using the at least one communication network.

In some embodiments, a structure of the garbled circuit entries may indicate a correspondence between the garbled circuit entries and a value of the each one bit; and the first garbled circuitry entry may be selected based the indicated correspondence. The first garbled circuitry entry may further comprise a value indicating a correspondence between the garbled circuit entries and a value of the each one bit; and the first garbled circuitry entry may be selected based the indicated correspondence. The processing circuitry is configured to further perform acts of: receiving, from the at least one computer in a first order, garbled circuit entries for garbled circuits corresponding to the multiple bits in the plurality of bits; and providing, to the at least one computer in a second order differing from the first order, output entries generated from the garbled circuit entries for the garbled circuits.

According to one aspect of the present application, at least one computer is provided. The at least one computer includes processing circuitry configured to perform, for each one bit of multiple bits in a plurality of bits: providing, to a device using at least one communication network, garbled circuit entries for a garbled circuit corresponding to the each one bit, the garbled circuit entries including a first garbled circuit entry including: a first input entry comprising a first input key encrypted with a device key associated with the device; and a first encrypted output entry comprising a first output entry encrypted with the first input key; receiving, from the device using the at least one communication network, the first output entry; generating a first output value by decrypting the first output entry using a computer key associated with the at least one computer; determining whether to authenticate the device using output values, the output values including the first output value; and providing an indication of the authentication determination to the device.

In some embodiments, providing the garbled circuit entries further may include: providing the first garbled circuit entry corresponding to a first bit value; and providing the second garbled circuit entry corresponding to a second bit value. Providing the first garbled circuit entry may include providing a first value indicating that the first garbled circuit entry corresponds to a first bit value. The first input key may be a symmetric key. Receiving the first output entry may include receiving a combination of a distance value, a device identifier, and a nonce. The output values may include first device identifiers; and determining whether to authenticate the device may include determining whether the first device identifiers match a second device identifier of the device. The output values may include nonces; and determining whether to authenticate the device may include determining whether any of the nonces match. The output values may include distance values; and determining whether to authenticate the device may include determining whether a sum of the distance values exceeds a maximum distance threshold. The distance values may depend on bit values of an enrollment PUF value received from the device by the at least one computer during an enrollment process. The garbled circuit entries for garbled circuits corresponding to different bits may include different input keys.

BRIEF DESCRIPTION OF THE DRAWINGS

Various aspects and embodiments of the disclosure will be described with reference to the following figures. It should be appreciated that the figures are not necessarily drawn to scale. Items appearing in multiple figures are indicated by the same reference number in all the figures in which they appear.

DETAILED DESCRIPTION

Figure 1A:
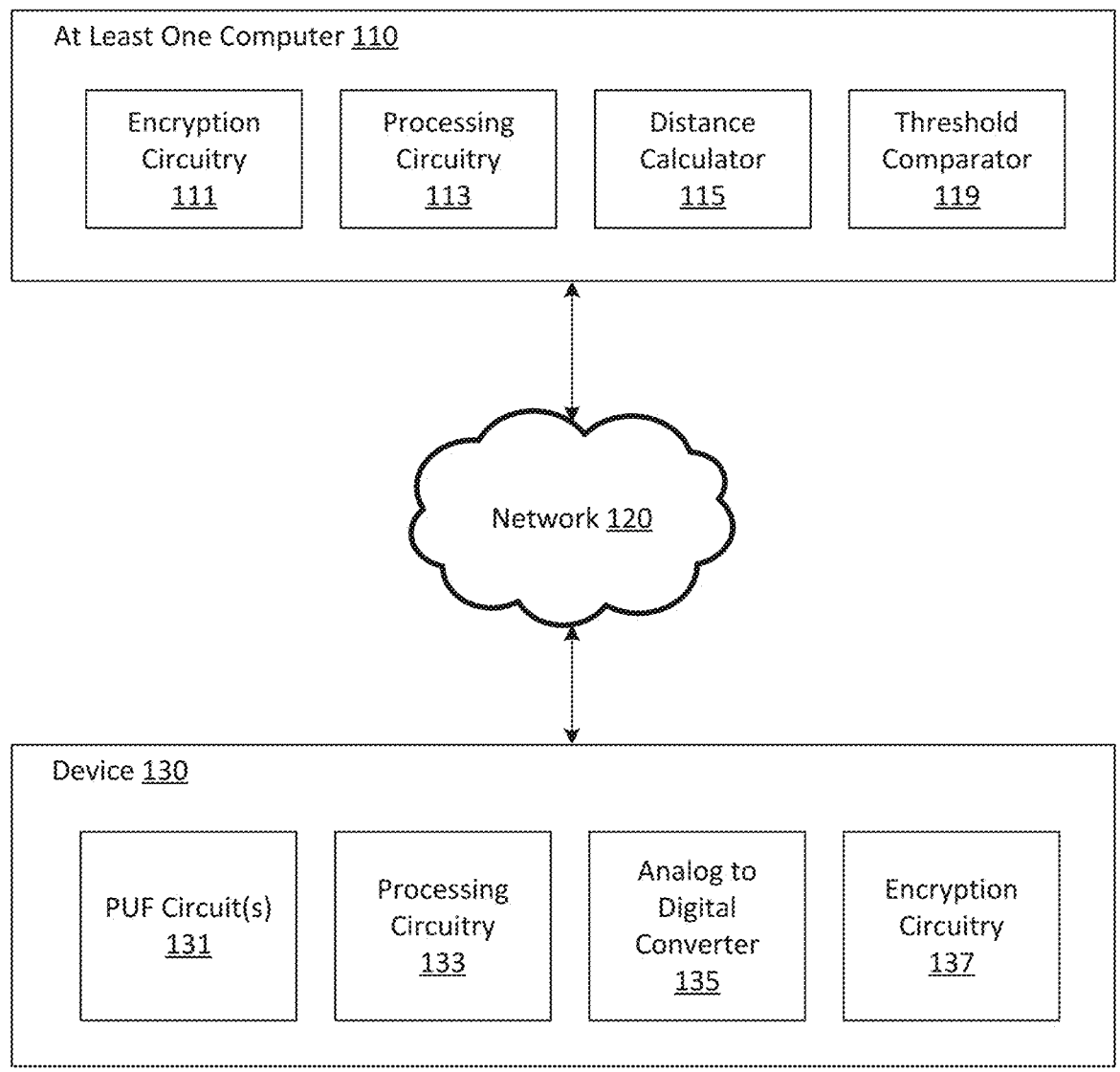
FIG. 1A shows an illustrative block diagram of an system including a device and at least one computer, in accordance with some embodiments.

The inventors have recognized and appreciated that conventional techniques for authenticating devices using PUF values and garbled circuits may be improved upon.

Some conventional PUF implementations use binary PUFs that produce an array of 1's and 0's where each bit is derived from an analog value proportional to the mismatch between two or more semiconductor devices. But, as the PUF circuitry ages, values generated by PUF circuitry may drift from an earlier recorded enrollment value over time. In binary PUF systems, aging may cause large errors from flipped bits and limit the useful life and the number of useful cells in the PUF systems. For example, PUF signals that are close to the threshold between zero and one may randomly be flipped between zero and one (e.g., due to measurement noise) without large changes to the underlying signal. Some conventional implementations use error correction across several values to address changes in PUF values resulting from the aging of PUF circuitry. However, such error correction is costly to implement and, as a result, is impractical to use for certain sensors, applications, and/or components. Furthermore, some error correction strategies reduce the effective entropy of the PUF value, weakening protection against impersonation attacks provided by conventional implementations that use error correction.

The inventors also recognized that some conventional PUF implementations are vulnerable to a number of security threats including replay and impersonation attacks. Some authentication protocols can become vulnerable when an adversary gains access to certain data. For example, if messages used in authentication are intercepted by an eavesdropping adversary, the adversary may be able to replay the messages or otherwise impersonate the device and achieve authentication of an inauthentic device. As another example, some PUF systems store PUF values during enrollment and later use these stored PUF values to authenticate the device. However, this storage may be compromised by an adversary who may steal the enrolled PUF values and use them to successfully impersonate valid devices.

Some conventional PUF implementations address the potential theft of stored PUF values using a class of cryptographic techniques based on garbled circuits, which allow two or more parties to securely compute a function. A device and a remote computer (e.g., one or more physical or virtual server, network appliance, or other suitable computing device) may communicate to jointly evaluate a garbled circuit that computes a distance between a PUF value obtained during enrollment of the device and a PUF value obtained during authentication of the device. The at least one computer may provide inputs for evaluating the garbled circuit to the device using a technique known as "oblivious transfer." This enables the at least one computer to transfer one of multiple possible input keys to the device, without the at least one computer knowing which input key was transferred. A significant drawback of oblivious transfer techniques, however, is that they use public key cryptography and are computationally resource intensive. Accordingly, techniques that use oblivious transfer are unsuitable for use with certain sensors; Internet of Things appliances; and/or components, such as Application Specific Integrated Circuits; Field-Programmable Gate Arrays; processors (e.g., processors configured for use with mobile devices, such as, for example, ARM Cortex-M Processors); Micro-Electro-Mechanical Systems; Analog to Digital Converters; Radio-Frequency Identification Tags; and/or Near Field Communications Tags.

Therefore, to improve authentication technology, the inventors have developed techniques for authenticating devices using PUF values and garbled circuits without using error correction and without using oblivious transfer. This provides a secure PUF-based authentication system that can be implemented in a computationally efficient manner unlike some conventional PUF-based authentication systems which are impractical due to the computational burden of error correction or oblivious transfer. Furthermore, not using error correction codes can increase the effective entropy of the PUF value, strengthening protection against impersonation attacks provided by the disclosed techniques.

In some embodiments, the techniques developed by the inventors include an enrollment phase and an authentication phase. During the enrollment phase, at least one computer (e.g., one or more physical or virtual server, network appliance, or other suitable computing device) and a device may cooperatively construct garbled circuits corresponding to multiple bits of an enrollment PUF value. For example, during an authentication phase, in response to an authentication request and using an authentication PUF value, the device may evaluate the garbled circuits without using oblivious transfer techniques to receive input values from the at least one computer. The device may provide the results of these evaluations to the at least one computer. The at least one computer may generate a distance between the enrollment PUF value and the authentication PUF value using these results, without using error correcting codes to account for PUF circuitry aging. When the distance is less than a threshold value, the at least one computer may authenticate the device.

Some embodiments of the technology described herein address some of the above-discussed drawbacks of conventional technology for authenticating devices using PUFs and garbled circuits. However, not every embodiment need address every one of these drawbacks or the improvements discussed above, and some embodiments may not address any of the them. As such, it should be appreciated that aspects of the technology described herein are not limited to addressing all or any of the above discussed drawbacks of conventional PUF authentication systems.

FIG. 1A shows an illustrative block diagram of a system 101 including at least one computer 110 and a device 130, in accordance with some embodiments. FIG. 1A includes at least one computer 110 connected to device 130 by network 120. The at least one computer 110 includes encryption circuitry 111, processing circuitry 113, distance calculator 115, and threshold comparator 119. These components can be realized in software, hardware, or a combination of software and hardware. The device 130 includes PUF circuit(s) 131, analog-to-digital converter (ADC) 135, encryption circuitry 137, and processing circuitry 133. The encryption circuitry 137 and processing circuitry 133 can be realized in software, hardware, or a combination of software and hardware. The at least one computer 110 and the device 130 may be configured to communicate over network 120 to enroll the device 130 with the at least one computer 110 during an enrollment phase and authenticate the device 130 using the at least one computer 110 during an authentication phase.

In some embodiments, the at least one computer 110 may encrypt and decrypt communications received via the network 120 from the device 130. The at least one computer 110 can include one or more physical or virtual server, network appliance, or other suitable computing device. In some embodiments, the encryption circuitry 111 may be configured to perform cryptographic key generation and symmetric encryption and decryption. In some embodiments, encryption circuitry 111 may also be configured to perform asymmetric encryption and decryption. The processing circuitry 113 may be any suitable processing circuitry such as an FPGA, ASIC, and/or microprocessor. In some embodiments, the processing circuitry 113 may perform and/or control all or portions of the enrollment and authentication process performed on the at least one computer 110.

In some embodiments, during enrollment of the device 130, the at least one computer 110 may be configured to generate garbled circuits corresponding to bits in an enrollment PUF received from device 130 using the encryption circuitry 111. In general, a garbled circuit may be implemented as a pipeline including multiple steps. The depth of the garbled circuit may be the number of steps in the pipeline. The garbled circuits generated by the at least one computer 110 may be evaluated in a single step. Therefore these garbled circuits may have a depth of one (the minimum depth for a garbled circuit). In some instances, at least one computer 110 may be configured to generate input entries for garbled circuits using input keys generated by encryption circuitry 111. In various embodiments, at least one computer 110 may be configured to generate output entries for garbled circuits using a key associated with the at least one computer 110. The encryption circuitry 111 may generate the key associated with the at least one computer 110. The output entries may include output values encrypted by encryption circuitry 111 using the key associated with the at least one computer 110. The encryption circuitry 111 may further encrypt each output entry using a corresponding one of the input keys. The at least one computer 110 may also be configured to provide a key to device 130 for encrypting communications between the at least one computer 110 and the device 130. The key may be a symmetric key and may be generated using encryption circuitry 111. During authentication of the device 130, the at least one computer 110 may be configured to decrypt output entries received from device 130 using the encryption circuitry 111 to generate output values.

In some embodiments, the output values may be provided to the distance calculator 115. The distance calculator 115 may compute any suitable distance metric using the received output values. As described herein, this distance may indicate the similarity of a current PUF value of the device 130 to the PUF value shared with the at least one computer 110 during enrollment of the device 130. For example, the distance calculator 115 may compute a hamming distance, Euclidean distance, or any suitable measure of distance. The distance calculator 115 may compare multiple distance values that were each generated by output values decrypted from output entries received from device 130 at different points in time.

In some embodiments, the threshold comparator 119 compares the computed distance(s) to a threshold to determine whether to authenticate the device. The threshold may be configured to be large enough to reliably authenticate the device 130 and small enough to uniquely authenticate the device 130. Since the threshold allows for some differences between the enrolled and current PUF values, as expressed in terms of the output values, the device may be authenticated without using error corrected PUF values. The threshold may also accommodate differences due to PUF circuit aging, though one or more values (e.g., the computed distance and/or the threshold) used in the authentication process may eventually be adjusted in response to time variation due to aging. If the computed distance exceeds the threshold, the device is not authenticated. The at least one computer 110 may be configured to authenticate the device 130 based on a single distance calculation (e.g., the most recent distance calculation) and/or based on the multiple distance values (e.g., according to a process that adjusts a maximum distance threshold to account for device aging).

In some embodiments, the network 120 may be any suitable wired or wireless, local or wide-area network. For example, the network 120 may be a wide area network including the internet (e.g., a virtual private network, overlay network, and/or internet traffic flows) with connections implemented via. 802.11 Wi-Fi, Ethernet, fiber-optics, or any suitable connection. In some embodiments, the network 120 may be an ad-hoc network using any suitable connection. In further embodiments, the network 120 may be a wired or wireless local network. In some embodiments, the local network 120 may include Bluetooth, near field communication, RFID, other passive sensor communication technology, or any other suitable local area communication. In some embodiments, the local network 120 may include wired connections, including Universal Serial Bus (USB), Inter-Integrated Circuit (I2C), Serial Peripheral Interface (SPI), network-on-chip (NOC), Peripheral Component Interconnect Express (PCIe), or any other suitable connection.

It should be appreciated, and the inventors have recognized, that various topologies of the network 120 may be better suited for various authentication methods that may be practiced according to the present disclosure. In some embodiments, for example where the network 120 is a local area network, the device 130 and/or the at least one computer 110 may employ one of several methods to generate encryption keys for secure authentication. In some embodiments, the at least one computer 110 may generate a key that may be shared with device 130. This key may be stored in device 130, for example, as fixed key in memory (e.g., one-time programmable memory). This key may also be stored in memory on the at least one computer 110. The shared key may be unique for each device and may be used to encrypt communications between the devices, generate suitable cryptographic proofs, or in any suitable manner.

In the illustrated embodiment, the device 130 may be any suitable mobile or stationary computing device that is to be securely authenticated. The device 130 may include any suitable processing circuitry (e.g., a microprocessor, field programmable gate array (FPGA), application specific integrated circuit (ASIC)) for carrying out the techniques and methods described herein. In some embodiments, the device 130 includes any suitable network interface(s) for communicating with the at least one computer 110, which may be at a local or remote proximity to the device 102. In some embodiments, the device 130 may be one of several devices configured to be authenticated by the at least one computer 110.

In some embodiments, the device 130 may use the PUF circuit(s) 131 to generate one or more PUF values that represent digitized values of one or more signals generated by the PUF circuit(s) 131. The PUF circuit(s) 131 may be integral with device. For example, the PUF circuits may be on the same die as processing circuitry in the device, in a same package as the device, physically connected to the device, and/or otherwise in electrical communication with the device 131. The PUF circuit(s) 131 may implement any suitable PUF to generate the signals, which may be analog signals. For example, the PUF circuit(s) 131 may generate analog signals such as a voltage mismatch, resistance capacitance product mismatches, transistor threshold voltage mismatch, transistor transconductance mismatch, and/or any other suitable analog circuit characteristics. The device may be configured not to store PUF values to ensure that the values cannot be taken from a memory by an adversary. Instead, PUF values may be regenerated each time that they are needed.

In some PUF systems, random access memory, ring oscillators, and/or arbiters may be used to quantify an analog characteristic of a circuit, for example by generating a single bit from a voltage mismatch. But, these coarsely quantized PUF systems lose information in the quantization process and may therefore be sensitive to aging of the underlying circuitry, thus requiring error correcting codes. The PUF circuit(s) 131 are operable to preserve a substantial amount of the analog information, and the system 101, along with other systems and methods described herein, may be used to authenticate the device 130 without using an error correcting code on the PUF values.

In some embodiments, the processing circuitry 133 may be any suitable processing circuitry such as an FPGA, ASIC, and/or microprocessor. In some embodiments, the processing circuitry 133 may perform and/or control performance of the disclosed enrollment and authentication process on the device 130.

In some embodiments, the ADC 135 digitizes the PUF values. The ADC 135, may be configured for high resolution readings of the analog signals from the PUF circuit(s) 131. The resolution may be high enough that quantization error is insubstantial compared to the PUF signal. For example, the ADC 135 may have a resolution of 8, 12, 16, or more bits. In some embodiments, the output of the ADC 135 may have a sufficiently high resolution to treat the digital PUF value as an analog signal in the digital domain.

It should be appreciated by those skilled in the art that PUF circuits 131 and ADC 135 may be merged into a single circuit. For example, the offset value of an ADC is affected by many device mismatch parameters within the ADC circuit, and conventionally this is considered to be problem rather than a desired effect; but, in the case of a PUF circuit, such behavior may be exploited to produce an ADC that directly produces a digitized PUF output value without requiring an explicit input signal that is derived from an analog circuit. A single ADC may produce many PUF outputs by using a multiplexor to insert devices, from an array of nominally-identical devices, into offset-sensitive circuit areas within the A/D converter, yielding different ADC codes for each selection.

In some embodiments, the encryption circuitry 137 may perform any suitable encryption and/or decryption for authenticating the device 130. In some embodiments, the encryption circuitry 137 may generate encryption keys, encrypt and decrypt communications with the authentication device 110, evaluate a garbled circuit, or perform any other suitable computation and/or storage used for encrypting or decrypting information related to the system 101. In some embodiments, the encryption circuitry may use a fixed encryption and/or decryption key that is shared with the authentication device 110. The encryption circuitry 137 may store encryption keys in an encrypted form. For example, the encryption circuitry 137 may be configured to store a key associated with device 130. This key may be a symmetric key. This key may be stored in an encrypted form. As an additional example, the encryption circuitry 137 may be configured to store a key for communicating with the authentication device 110. This key may also be a symmetric key and may also be stored in an encrypted form.

In some embodiments, during enrollment of the device 130, the encryption circuitry 137 may be configured to enroll the device 130 in a garbled circuit protocol. For example, the device 130 may receive input keys for garbled circuits corresponding to bits of an enrollment PUF value, encrypt the input keys using the key associated with device 130, and send the encrypted input key values to the at least one computer 110. During authentication of the device 130, the encryption circuitry 137 may receive garbled circuit entries from the at least one computer 110. The garbled circuit entries may include input entries and corresponding encrypted output entries. The input entries may include input keys encrypted with the key associated with device 130. The device 130 may be configured to select one of the input entries and decrypt the selected input entry, using the encryption circuitry 137 and the key associated with device 130, to recover an input key. The device 130 may be configured to decrypt the corresponding encrypted output entry, using the encryption circuitry 137 and the input key. The device 130 may then send the resulting, decrypted output entry to the at least one computer 110.

Figure 1B:
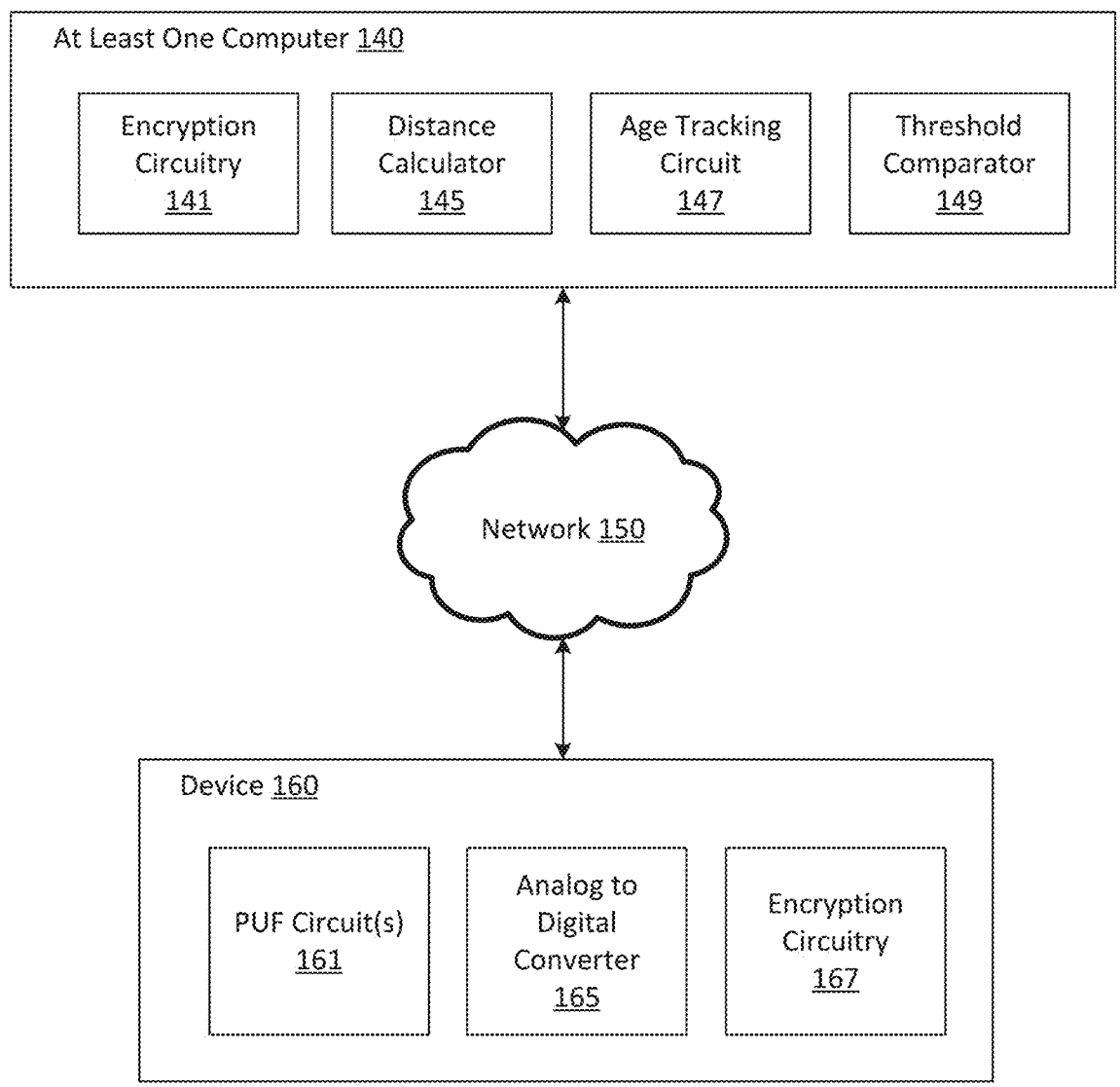
FIG. 1B shows an illustrative block diagram of an system including a device and at least one computer that adjusts distance thresholding values, in accordance with some embodiments.

FIG. 1B shows an illustrative block diagram of a system 102 including a device 160 and at least one computer 140 that adjusts authentication distance thresholds, in accordance with some embodiments. The device 160 includes PUF circuit(s) 161, ADC 165, and encryption circuitry 167. The encryption circuitry 167 can be realized in software, hardware, or a combination of software and hardware. The at least one computer 140 can include one or more physical or virtual server, network appliance, or other suitable computing device. The at least one computer 140 includes encryption circuitry 141, distance calculator 145, age tracking circuit 147, and threshold comparator 149. These components can be realized in software, hardware, or a combination of software and hardware. The at least one computer 140 and the device 160 may be configured to communicate over network 150 to enroll the device 140 with the at least one computer 160 during an enrollment phase and authenticate the device 160 using the at least one computer 140 during an authentication phase.

In some embodiments, during the enrollment phase, the at least one computer 140 may be configured to receive a PUF value from the device 160. The at least one computer 140 may be configured to generate garbled circuit entries corresponding to at least some of the bits of the PUF value. The garbled circuit entries may include input keys and output values. The at least one computer 140 may be configured to encrypt the output value for a garbled circuit entry with the input key for the garbled circuit entry, using the encryption circuitry 141. The at least one computer 140 may be configured to provide the input keys to the device 160 to be encrypted with a key associated with the device 160. The at least one computer 140 may receive the input keys, encrypted with the key associated with the device 160, from the device 160. The at least one computer 140 may store the encrypted input keys in association with the corresponding output values of the garbled circuits.

In some embodiments, during the authentication phase, the at least one computer 140 may provide the garbled circuit entries corresponding to at least some of the bits of the PUF value to the device 160. The at least one computer 140 may receive an output values from the device 160. The output values may correspond to the at least some of the bits of the PUF value. The at least one computer 140 may determine a distance from the output values using distance calculator 145. The computed distance may be provided to the age tracking circuit 147. In some embodiments, the age tracking circuit 147 may track time variations of the computed distance and produce an indication of the aging of the PUF circuit(s) 161. The computed distance may also be provided to threshold comparator 149, which may be configured to authenticate device 140 when the value of the computed distance is less than a threshold value.

In some embodiments, during the enrollment phase, the device 160 may generate an enrollment PUF value using the PUF circuit(s) 161. The device 160 may provide this PUF value to at least one computer 140. The device 160 may be configured to receive from at least one computer 140 input keys for garbled circuits corresponding to the bits of the PUF. The device 160 may use encryption circuitry 167 to encrypt these received input values using a key associated with the device 160. In some embodiments, the encryption circuitry 167 may be configured to generate the key associated with the device. In various embodiments, the device 160 may be configured to obtain the key from another device. The key may be a symmetric key. The device 160 may be configured to provide the encrypted input values to at least one computer 140.

In some embodiments, during an authentication phase, the device 160 may generate an authentication PUF value using the PUF circuit(s) 161. The device 160 may receive garbled circuit entries corresponding to bits in the PUF value. Each garbled circuit entry may include an encrypted input key and an encrypted output entry. For each of multiple bits in the PUF value, the device 160 may select one of the garbled circuit entries based on the value of the corresponding PUF bit. The device 160 may use the encryption circuitry 167 to decrypt the encrypted input key, then use the input key to decrypt the output entry. The device 160 may provide the output entry to the at least one computer 140. In response, the device 160 may receive an indication of whether authentication has succeeded.

Figure 2A:
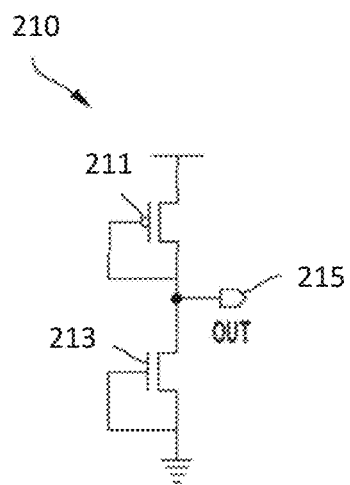
FIGS. 2A and 2B show illustrative diagrams of PUF circuits, in accordance with some embodiments.
Figure 2B:
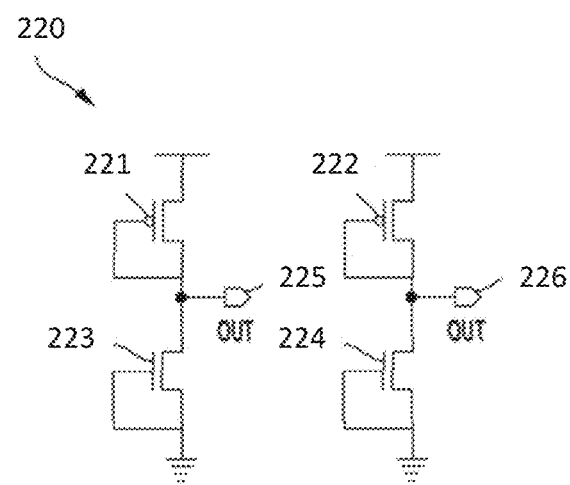

FIGS. 2A and 2B show illustrative diagrams of PUF circuits 210 and 220, in accordance with some embodiments. The PUF circuit 210 includes transistor 211 and transistor 213 that are electrically connected to output 215. The circuit 210 is configured to generate an analog voltage signal that may be used as a PUF value. The PUF value can depend on the physical characteristics of circuit 210. In the illustrative embodiment of FIG. 2A, transistor 211 is a PFET, and transistor 213 is an NFET. With the circuit configuration shown, the voltage at the output 215 is equal to the supply voltage minus the difference between the threshold voltages of the transistors 211 and 215. Since the threshold voltages of the transistors 211 and 215 are subject to small, unpredictable variations from the manufacturing process, the voltage at the output cannot be known a priori and is highly likely to be unique to the transistors 211 and 215. The voltage at the output 215 may also include thermal noise that prevents all output values from being identical in practice.

FIG. 2B includes two circuits of the same configuration as FIG. 2A. The PUF circuit 220 includes transistors 221 and 222, transistors 223 and 224, and outputs 225 and 226. Each pair of transistors, the pair 221 and 222 as well as the pair 223 and 224, may function in the same way as the pair of transistors in FIG. 2A. In some embodiments, each pair of transistors may be used to create a single PUF signal. In some embodiments, both outputs 225 and 226 may be provided to a same analog-to-digital converter as a differential input. In some embodiments, the PUF circuitry may be configured to select pairs of transistors for comparison. It should be appreciated that the illustrative PUF circuits are provided as non-limiting examples and any suitable PUF circuitry may be used.

Figure 3:
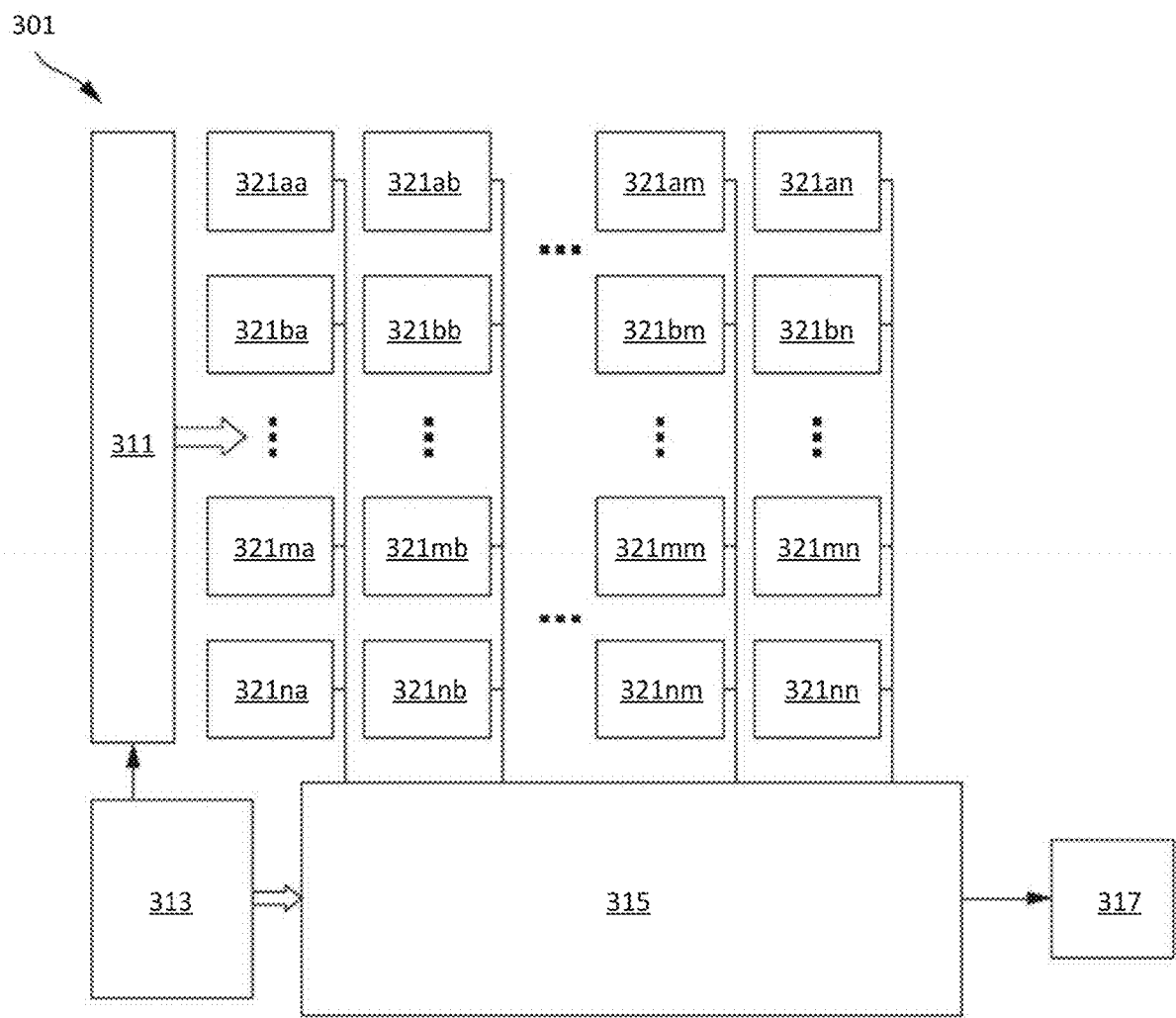
FIG. 3 shows an illustrative block diagram of an array of PUF circuits, in accordance with some embodiments.

FIG. 3 shows an illustrative block diagrams of an array 301 of PUF circuits 321aa-nn, in accordance with some embodiments. FIG. 3 includes PUF circuits 321aa-nn (note that they are lettered according to matrix notation), decoder 311, timing controller 313, analog multiplexer 315, and analog-to-digital converter 317. The array 301 is operable to generate PUF values (e.g., as was discussed with reference to the PUF circuit(s) of FIGS. 1A and 1B) and may include any suitable PUF circuitry (e.g., PUF circuits 210 and 220).

In some embodiments, the PUF circuits 321aa-nn may include the PUF circuits discussed with reference to FIG. 2. By arranging multiple PUF circuits 321aa-nn in an array 301, a PUF value may be generated by addressing a particular PUF circuit in the array 301. The decoder 311 is configured to enable selected PUF circuit(s) to output PUF values. The decoder 311 may address the PUF circuits 321aa-nn in any suitable manner. For example the decoder may scan rows and columns and may also allow for individual addressing of the PUF circuits. The PUF circuit addresses may be received at the decoder from any suitable source such as a network interface or an order in memory. In this manner, a PUF value can be generated by selecting from a plurality of respective signals generated by a respective plurality of PUF circuits.

In some embodiments, the timing controller 313 is configured to control the decoder 311 and the multiplexer 315. The timing controller may control sequential readings and/or scanning of the PUF circuits 321aa-nn. For example the timing controller 313 may change the multiplexer 315 input at certain intervals and/or enable the multiplexer 315 to ensure that the PUF circuits 321aa-nn generate a valid PUF signal.

In some embodiments, the multiplexer 315 passes one analog input signal to the ADC 317, which may be configured for high resolution readings of the analog signals from the PUF circuits 321aa-nn. The resolution may be high enough that quantization error is insubstantial compared to the PUF signal. For example, the device and PUF circuits may use an ADC with 8, 12, 16, or more bits. In some embodiments, the output of the ADC may have a sufficiently high resolution to treat the digital PUF value as an analog signal in the digital domain.

Figure 4:
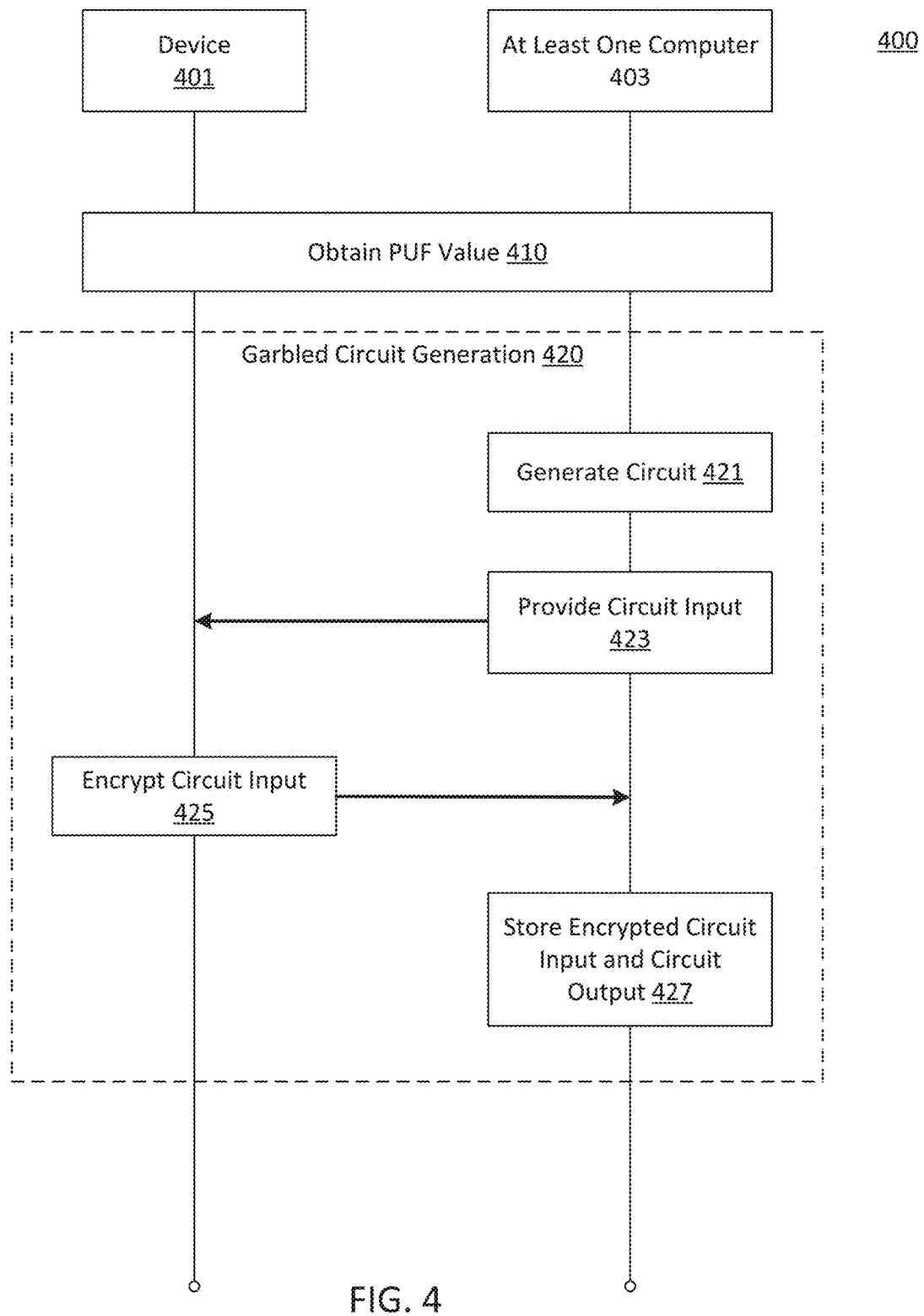
FIG. 4 shows an illustrative process for enrolling a device in an authentication system using PUF values and garbled circuits, in accordance with some embodiments.

FIG. 4 shows an illustrative process 400 for enrolling a device in an authentication system using PUF values and garbled circuits, in accordance with some embodiments. Process 400 may include communications between device 410 and at least one computer 403. Device 401 may be configured as described above with regards to device 130 of FIG. 1A or device 160 of FIG. 1B. Similar, at least one computer 403 may be configured as described above with regards to at least one computer 110 of FIG. 1A or at least one computer 140 of FIG. 1B.

In some embodiments, communications between device 410 and at least one computer 403 may be encrypted. For example, the device 401 and the at least one computer 403 may be configured to encrypt communications using a symmetric key received from the at least one computer 403. The key may be generated by at least one computer 403. Alternatively, device 401 may be configured to generate and share this cryptographic key with at least one computer 110.

Process 400 includes an act 410 of obtaining an enrollment PUF value and a second act 420 of garbled circuit generation. The second act 420 may be performed for at least some (e.g., all) of the bits of the PUF value. Process 400 may configure the at least one computer 403 to enable authentication of device 401 without at least one computer 403 having to obtain a PUF value for device 401 during such authentication. Thus at least one computer 403 may authenticate device 401 without storing the enrollment PUF value or receiving an authentication PUF value during authentication. Accordingly, even if at least one computer 403 is compromised by an attacker, the attacker will not be able to learn the PUF for device 401.

The device 401 and the at least one computer 403 may both obtain an enrollment PUF value in act 410, in some embodiments. This PUF value may be obtained by device 401 from a PUF circuit, such as the PUF circuit described in FIGS. 2A, 2B, and 3. The device 401 may be configured to provide this PUF value to the at least one computer 403. The PUF value may be provided to the at least one computer 403 over a network, such as network 130 of FIG. 1A or network 150 of FIG. 1B. The at least one computer 403 may receive the PUF value and use the PUF value in generating garbled circuits for authenticating the device 401.

Next process 400 proceeds to act 420, where the device 401 and the at least one computer 403 collaborate to generate garbled circuits for authenticating the device 401. For at least some (e.g., all) of the bits of the PUF value, a one-to-one correspondence may exist between each bit and each garbled circuit. For example, when the PUF value includes 128 bits, the device 401 and the at least one computer 403 may collaborate to construct 128 garbled circuits, each with a one-to-one relationship to a bit of the PUF value. In some embodiments, each garbled circuit can include a single gate and the device 401 and the at least one computer 403 may collaborate to construct 128 gates, each with a one-to-one relationship to a bit of the PUF value.

In some embodiments, performance of act 420 includes performance of acts 421, 423, 425, and 427 for each garbled circuit generated. Performance of these acts can be divided between the device 401 and the at least one computer 403. In act 421, the at least one computer 403 generates multiple entries for a garbled circuit corresponding to a bit of the enrollment PUF value obtained in act 410. The garbled circuit may have a depth of one. These garbled circuit entries may correspond to bit values (e.g., zero or one) and may therefore include an entry corresponding to a potential bit value of zero and an entry corresponding to a potential bit value of one. The potential bit values may correspond to potential bit values for an authentication PUF value to be obtained during authentication of the device 410. The at least one computer 402 may generate the garbled circuit entries using the potential value corresponding to the entry and the actual value of the corresponding bit in the enrollment PUF value.

In some embodiments, each garbled circuit may include multiple garbled circuit entries. These garbled circuit entries may correspond to potential authentication PUF bit values of either zero or one. For example, a first garbled circuit entry may correspond to a potential authentication PUF bit value of zero and a second garbled circuit entry may correspond to a potential authentication PUF bit value of one. Each entry of the garbled circuit may include an input value and an encrypted output entry.

In some embodiments, the input value may comprise an input key. The input key may be generated by at least one computer 403 and may be a symmetric key. In some embodiments, the input key may be specific to a particular entry of a particular garbled circuit. For example, when at least one computer 403 generates 128 garbled circuits corresponding to a 128-bit PUF value, the input keys for each entry of each garbled circuit may be unique. In various embodiments, the same input key may be shared between one or more of the garbled circuits. For example, the first entries (or the second entries) of two or more garbled circuits may share the same input key. This input key may differ from the input keys of the remaining entries of the garbled circuits.

In some embodiments, the encrypted output entry may include an output entry encrypted using the input key for the garbled circuit entry. During authentication of the device 401, the at least one computer 403 may decrypt an encrypted output entry to generate an output entry. The output entry can, in turn, include an output value encrypted with a key associated with the at least one computer 403. The key may be a symmetric key. The output value may include multiple combined components. For example, the output value may be the concatenation of the multiple components. As an additional example, the output value may be a data structure including or indicating the multiple components. During authentication of the device 401, the at least one computer 403 may decrypt an output entry to generate an output value. The output value may be decomposed into the multiple components. The at least one computer 403 may then use one or more of these components to authenticate the device 401.

In some embodiments, a first component of the output value may indicate a distance between a potential PUF bit value corresponding to the entry and the actual enrollment PUF bit value obtained during enrollment of device 401. For example, the first component may be a function of the potential PUF bit value and the actual PUF bit value. In some embodiments, the first component may be the XOR of the potential PUF bit value and the actual PUF bit value.

In some embodiments, a second component of the output value may be metadata for the device 401. In some embodiments, this metadata may enable identification of the device 401. This device identifier may be a numeric value, a URL or URI, a pointer or address to identifying information, a string of alphanumeric characters, or similar data or instructions sufficient to identify device 401. In some embodiments, the second component of the output value may be common to all of the garbled circuits generated in act 420. Including a device identifier in the output value enable at least one computer 403 may prevent impersonation attacks in which output values for another device are provided in place of output values for device 403.

In some embodiments, a third component of the output value may be a nonce. The nonce may be a numerical value or an alphanumeric string. The nonce may be randomly generated by at least one computer 403. In some embodiments, the third component of the output value may be different for all of the garbled circuits generated in act 420. Including the nonce may prevent replay attacks in which an attacker repeatedly provides the same output value during authentication.

Though described as a first, second, and third component, this ordering is exemplary and not intended to be limiting. Furthermore, the output values may comprise a combination of fewer components (e.g., only the first component) or more components (e.g., additional conditions or restrictions on authentication), without limitation.

As described above, in some embodiments the garbled circuit entries may correspond to potential authentication PUF bit values. This correspondence may be indicated implicitly or explicitly. For example, the garbled circuit entries for a garbled circuit may implicitly indicate the correspondence using an index of an entry in a data structure, or the order in which entries are stored by at least one computer 401 or provided to device 403. Alternatively or additionally, the correspondence may be expressly indicated using entry indicators stored in the garbled circuit entries. For example, a garbled circuit entry corresponding to a potential authentication PUF bit value of one may include an entry indicator having a bit value of one (or any other value having an equivalent semantic meaning. The device 401 may use such bit values during authentication to select an entry of the garbled circuit for decryption.

In act 423, the at least one computer 403 provides the input values for the garbled circuit to the device 401. The input values may be provided to the device 401 over a network (e.g., network 120 or network 150). The input value entry may be encrypted during communication using a shared key. In some embodiments, the at least one computer 403 may be configured to further provide the entry indicators to the device 401.

In act 425, the device 401 encrypts the received input values to generate input entries. As described above, the input values may comprise input keys. The device 401 may be configured to encrypt the input keys using a key associated with the device 401. The key associated with the device may be a symmetric key. In some embodiments, the device 401 may use a different key to encrypt the input values for each garbled circuit. In various embodiments, the device 401 may use the same key to encrypt the input values for one or more of the garbled circuits. In some embodiments, the device may be configured to encrypt the received input values together with the entry indicators to generate the input entries. For example, a data structure containing the input values together with the entry indicators may be encrypted to generate the input entries. Alternatively the entry indicators may be encrypted separately from the input values, or the entry indicators may not be encrypted. The device 401 may be configured to then provide the input entries to the at least one computer 403 (and may also provide the entry indicators, in embodiments including entry indicators in which the input entries do not contain the entry indicators). By encrypting the input values with the key associated with the device 401, the device 401 may prevent an attacker controlling the at least one computer 403 from obtaining the input keys once the enrollment process 400 is complete.

Figure 5:
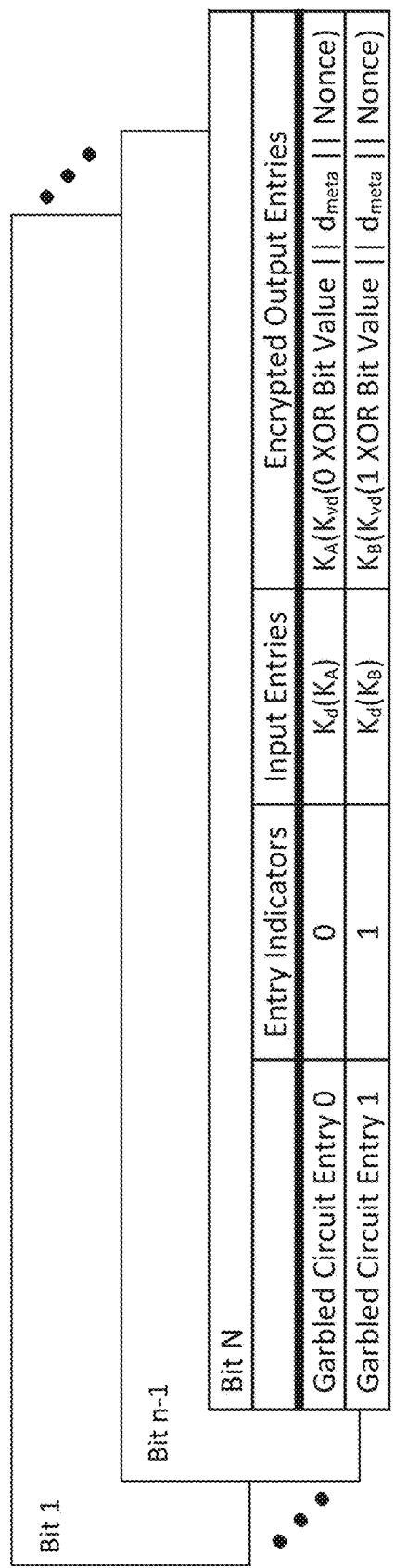
FIG. 5 shows an illustrative garbled circuit created using an enrollment process, in accordance with some embodiments.

In act 427, the at least one computer 403 receives from device 401 the input entries for the garbled circuit. The at least one computer 403 may be configured to receive the input entries over the network (e.g., network 120 or network 150) The at least one computer 403 may store the input entries together with the encrypted output entries for the garbled circuit. For example, the garbled circuit, including the input entries and encrypted output entries, may be stored in a computer memory of at least one computer 403, or that the at least one computer 403 may access. In some embodiments, when the input entries do not include entry indicators indicating the value of the corresponding potential authentication bit, the input entries and output entries may be stored in association with such entry indicators, as depicted in FIG. 5. After completion of act 427, process 400 completes.

Upon completion of the enrollment phase, in some embodiments, the at least one computer 403 may retain the input entries and encrypted output entries of the garbled circuits. However, the at least one computer 403 may delete the enrollment PUF value received from the device 401. The at least one computer 403 may also delete any versions of the input keys accessible by the at least one computer 403.

For example, the at least one computer 403 may delete any plaintext versions of the input keys, or any encrypted version of the input keys that at least one computer 403 can decrypt. In some embodiments, an input key may be deleted after generating the encrypted output entries for the garbled circuits using the input key. In various embodiments, the enrollment PUF value may be deleted after generating the output values, or the first components of the output values, for the garbled circuits. As described above, these input entries include input keys encrypted with key(s) associated with the device 401. In some embodiments, the at least one computer 403 cannot decrypt these encrypted input keys. Deleting the PUF value and plaintext and decryptable input keys in this manner may prevent an attacker that compromises the at least one computer after completion of the enrollment phase from recovering the PUF value or the input keys, while permitting authentication using the garbled circuit.

FIG. 5 shows an illustrative garbled circuit 500 created using an enrollment process, in accordance with some embodiments. As shown, the garbled circuit corresponds to bit n of a n-bit PUF value. The depicted garbled circuit comprises two entries (garbled circuit entry 0 and garbled circuit entry 1): one entry for each potential authentication PUF bit value. Each entry contains an entry indicator value, an input entry and an encrypted output entry. In some embodiments, garbled circuit 500 may not include the entry indicator value. Instead, the PUF bit value may be represented implicitly (e.g., by the location or index of the entry in a data structure storing the garbled circuit). The garbled circuit depicted in FIG. 5 is exemplary and not intended to be limiting.

In some embodiments, each input entry may include an input key (e.g., $K_A$ and $K_B$). These input keys may be encrypted using a device key (e.g., $K_d$) associated with the device (e.g., device 401). The encrypted output entries may include an output entry (e.g., $K_{v_d}$(0 XOR Bit Value||$d_{meta}$|| Nonce) encrypted with one of the input keys (e.g., $K_A$ and $K_B$). In various embodiments, each output entry may include an output value comprising three components (e.g., 0 XOR Bit Value, $d_{meta}$, and Nonce) encrypted with a computer key associated with the at least one computer 403 (e.g., $K_v$d). This encryption can be performed using a semantically secure symmetric cipher that incorporates randomness, such that multiple encryptions of the same value will appear different to adversaries that do not know the decryption key. The first component may be a function (e.g., a logical XOR) of the potential authentication PUF bit value (e.g., 0 or 1) and the bit value for the bit of the enrollment PUF value (e.g., as depicted in FIG. 5, the value of the $n^{th}$ bit of the enrollment PUF value). The second component, $d_{meta}$ may be device meta data, and may be common to all the garbled circuits corresponding to the bits of the PUF value. The third component, $random_n$ may be a random value specific to the $n^{th}$ garbled circuit. The first, second, and third components may be combined (e.g., included in a data structure, or concatenated as shown).

Figure 6:
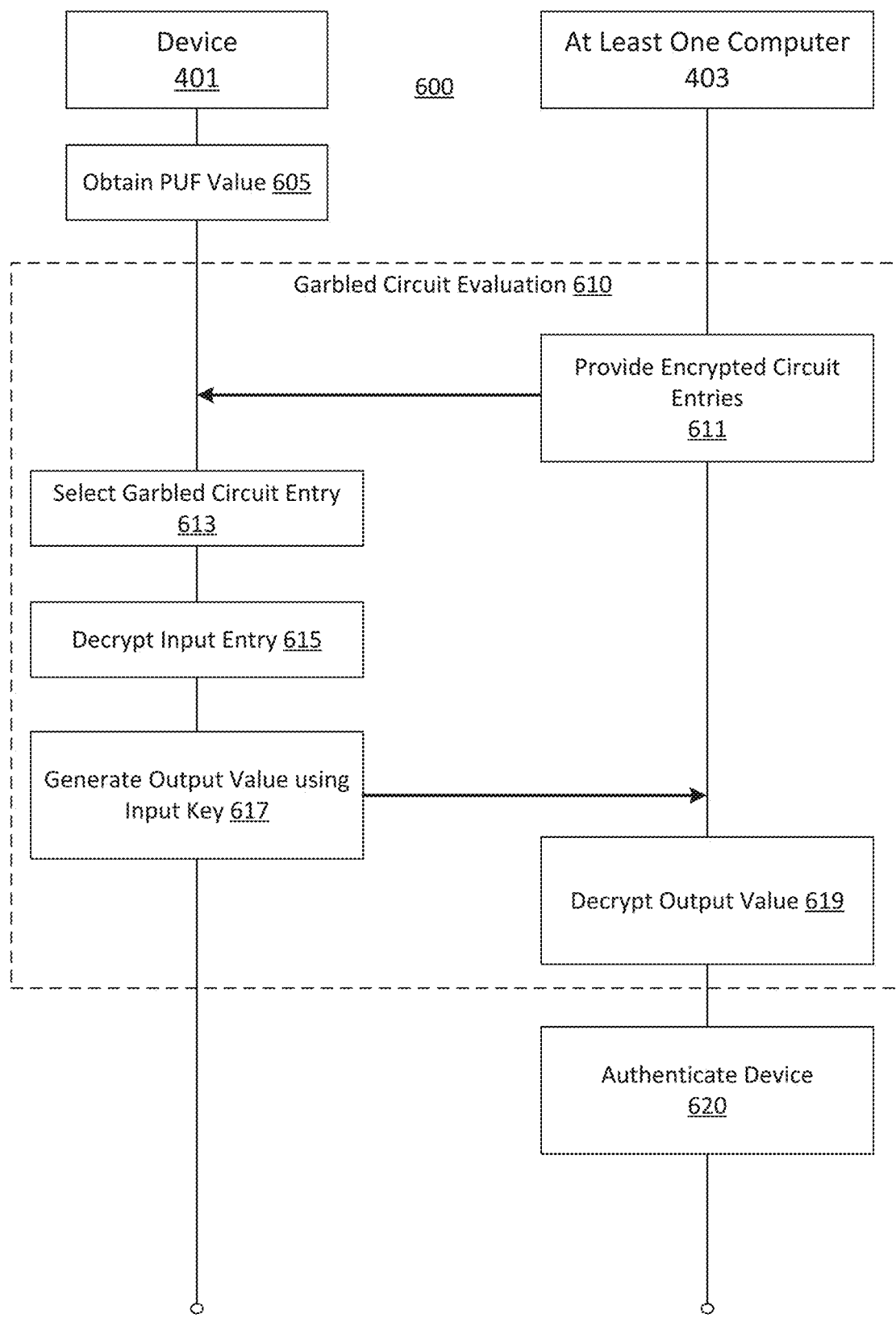
FIG. 6 shows an illustrative process for authenticating a device using PUF values and garbled circuits, in accordance with some embodiments.

FIG. 6 shows an illustrative process 600 for authenticating a device using PUF values and garbled circuits, in accordance with some embodiments. Process 600 may be performed by a device 401 and at least one computer 403, as described above. Process 600 includes the act 605 of obtaining an authentication PUF value. The authentication PUF value may be obtained by device 401 from PUF circuitry (e.g., PUF circuit(s) 131 or PUF circuit(s) 161). Process 600 also includes the act 610 of garbled circuit evaluation.

In some embodiments, device 401 and at least one computer 403 may communicate to evaluate entries for garbled circuits corresponding to multiple bits of the authentication PUF value. The garbled circuits may have a depth of one. The entries for the garbled circuits may have been created using the enrollment process described above with regards to FIG. 4. The entries for the garbled circuits may therefore incorporate information about an enrollment PUF value.

In some embodiments, the at least one computer 403 may generate an indication of the similarity between the enrollment PUF value and the authentication PUF value by evaluating the entries for the garbled circuits, without the at least one computer 403 retaining the enrollment PUF value or the device 401 sharing the authentication PUF value with the at least one computer 403.

In some embodiments, performance of act 610 includes performance of acts 611, 613, 615, 617, and 619 for each garbled circuit generated during the enrollment phase. In act 611 the at least one computer 403 provides entries for the garbled circuit to the device 401. The at least one computer 403 may be configured to retrieve these garbled circuit entries from one or more computer memories of at least one computer 403, or one or more computer memories accessible to at least one computer 403. The garbled circuit entries may correspond to a bit of the authentication PUF value obtained in act 605. In some embodiments, one garbled circuit entry may correspond to a potential authentication PUF bit value of zero and another garbled circuit entry may correspond to a potential authentication PUF bit value of one. Each garbled circuit entry may include an input entry and an encrypted output entry. In some embodiments, each garbled circuit entry may also include an entry indicator that indicates the authentication PUF bit value to which the garbled circuit entry corresponds (e.g., zero or one). The garbled circuit input entries may include input keys encrypted with a key associated with the device 401. The encrypted output entries may include output entries encrypted with corresponding input keys. The output entries may comprise output values encrypted with a key of the at least one computer 403. As described above with regards to FIGS. 4 and 5, the output values may include multiple components. At least one of the components may depend on the potential bit value of the authentication bit (e.g., zero or one) and the bit value of the corresponding bit of the enrollment PUF value. The at least one computer 403 may provide the garbled circuit entries to the device 401 using a network (e.g., network 120 or network 150).

In act 613, the device 401 selects a garbled circuit entry. The garbled circuit entry may be selected based on the authentication PUF value. In some embodiments, the device 401 may select a garbled circuit entry corresponding to a potential PUF bit value that matches the actual authentication PUF bit value. As a non-limiting example, the garbled circuit may correspond to the $n^{th}$ bit of the authentication PUF value. The value of the $n^{th}$ bit may be zero. The device 401 may select the garbled circuit entry corresponding to a potential authentication PUF bit value of zero. In some embodiments, the device 401 may select a garbled circuit entry by matching the actual authentication PUF bit value to an entry indicator for the entry (e.g., the entry indicator value depicted in FIG. 5). In various embodiments, the PUF bit value may be represented implicitly (e.g., by the location or index of the entry in a data structure storing the garbled circuit) and the device 401 may select the garbled circuit entry based on this implicit information (e.g., by selecting the first entry in the data structure when the actual PUF bit value is zero).

In act 615, the device 401 decrypts the input entry for the selected garbled circuit entry to generate an input key. The device may decrypt the input entry using the key associated with the device 401, which may be a symmetric key.

In act 617, the device 401 generates an output entry using the input key generated by act 615. The device 401 may decrypt the encrypted output entry for the selected garbled circuit entry using the input key to generate the output entry. The input key may be a symmetric key. The device 401 may be configured to provide the output entry to at least one computer 403 using the network (e.g., network 120 or network 150).

In act 619, the at least one computer 403 receives the output entry from the device 401. The at least one computer 403 may be configured to decrypt the output entry using a key associated with the at least one computer 403 to generate an output value. The output value may include a combination of multiple components (e.g., a concatenation of the multiple components or a data structure including or indicating the multiple components). These components may include a first component that indicates a distance between the bit value of the authentication bit and the bit value of the enrollment bit (e.g., zero when the authentication bit and the enrollment bit were the same, one otherwise); a second component with metadata of the device, and a third component that protects against replay attacks.

In act 620, the at least one computer 403 determines whether the device 401 is authentic. This determination may depend on the results of evaluating the garbled circuits (e.g., the components generated from the output values). In some embodiments, at least one computer 403 may be configured to determine device 401 has failed authentication during garbled circuit evaluation. For example, the determined metadata of the device may be incorrect, or may change between received output values. As an additional example, the value of the third component may be the same as a previously received third component value. In such instances, at least one computer 403 may end garbled circuit evaluation before all garbled circuits have been evaluated. At least one computer 403 may then provide an indication of failed authentication to device 401. Otherwise, at least one computer 403 may be configured to determine whether a distance between the enrollment PUF value and the authentication PUF value, calculated based on the first component of the output values, satisfies a distance criterion. After completion of act 620, process 600 completes.

In some embodiments, the device 401 and the computer 403 may be configured to create multiple sets of garbled circuits during the enrollment phase. Each set of garbled circuits may be generated as described above with regard to FIG. 4. In some embodiments, each set of garbled circuits may use a different device key and/or a different computer key. In various embodiments, at least one of the nonces, device identifiers, or input keys may differ among the sets of garbled circuits. One of the sets of garbled circuits may be used, as described above with regards to FIG. 6, each time the device 401 authenticates to the computer 403. The computer 403 may be configured to delete each set of garbled circuits after it is used and to use the remaining sets for future authentications.

Figure 7:
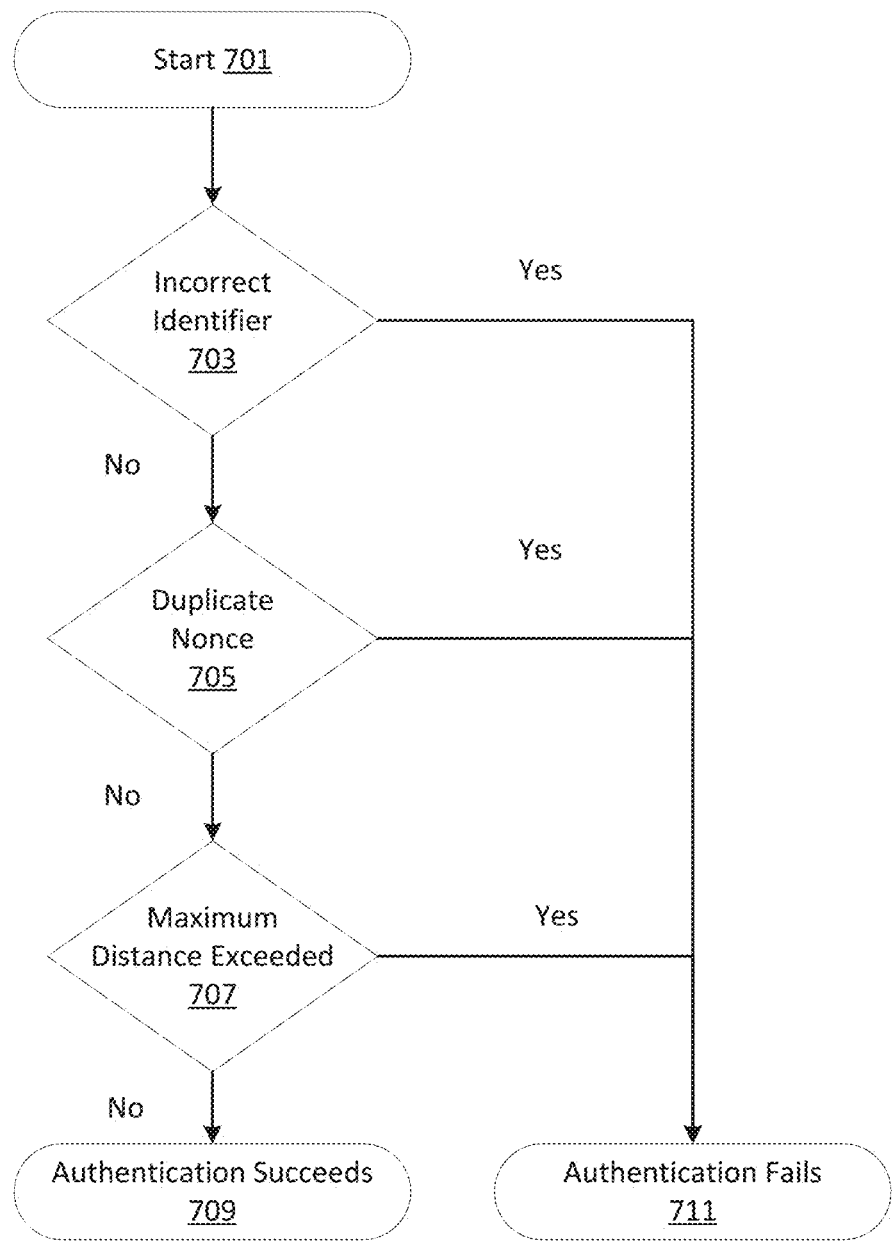
FIG. 7 shows an illustrative process for authenticating a device, in accordance with some embodiments.

FIG. 7 shows an illustrative process 700 for authenticating a device (e.g., device 401), in accordance with some embodiments. At least one computer 403 begins performance of process 700 in act 701 during garbled circuit evaluation or upon completion of garbled circuit evaluation (garbled circuit evaluation may be performed as described above with regards to FIG. 6).

In act 703, at least one computer (e.g., at least one computer 403) determines whether a device metadata component includes incorrect information. In some embodiments, this incorrect information may include values differing from other metadata values. For example, the at least one computer may be configured to determine whether any values of the output value second component (e.g., device metadata) differ. In some embodiments, when such values differ then one is incorrect and authentication fails (e.g., process 700 proceeds to step 711). As an additional example, the at least one computer may be configured to determine whether the metadata component identifies the correct device. For example, the at least one computer may be configured to compare the metadata component values to known values for the device. These known values may be stored in a memory of the at least one computer, or in a memory accessible to the at least one computer. If the metadata does not correctly identify the device, then authentication fails (e.g., process 700 proceeds to step 711). Otherwise, process 700 proceeds to act 705.

In act 705, the at least one computer determines whether the third components of the output values include any duplicate values. If such duplicates are detected, then authentication fails (e.g., process 700 proceeds to step 711). Otherwise, process 700 proceeds to act 707.

In act 707, the at least one computer determines whether a function of the output value first components (e.g., the distances between the bit values for the enrollment PUF value and the authentication PUF value) exceeds a distance threshold. If the threshold is exceeded then authentication fails (e.g., process 700 proceeds to step 711). Otherwise, authentication succeeds (e.g., process proceeds to step 709).

In act 709, the at least one computer provides an indication of a successful authentication to the device. For example, the at least one computer may be configured to provide an authentication token or ticket that enables the device to access services provided by the at least one computer or other devices. After completion of step 709, process 700 completes.

In act 711, the at least one computer provides an indication of an unsuccessful authentication attempt to the device. For example, the at least one computer may be configured to provide a message that authentication was not successful. After completion of step 711, process 700 completes.

The ordering depicted in FIG. 7 is intended to be exemplary and non-limiting. For example, the determination of repeated nonce values may be performed first and the device metadata checking may be performed second. Additional checks may be performed (e.g., checking conditions on authentication), or fewer checks may be performed (e.g., not checking device metadata in step 703 or not checking for duplicate nonces in step 705), without limitation.

Figure 8:
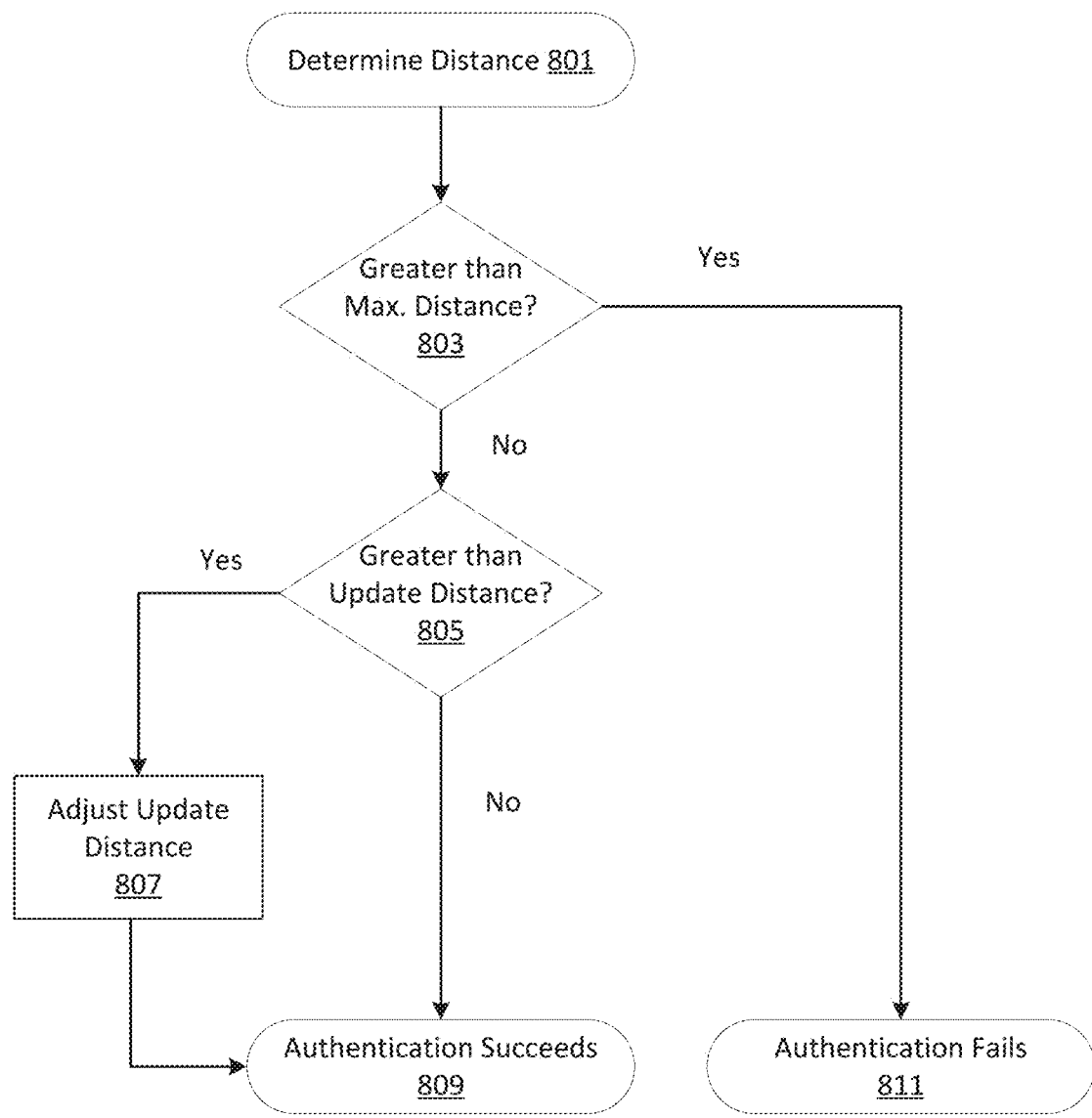
FIG. 8 shows an illustrative process for evaluating a distance threshold criterion, in accordance with some embodiments.

FIG. 8 shows an illustrative process 800 for evaluating a distance threshold criteria, consistent with disclosed embodiments. According to process 800, at least one computer (e.g., at least one computer 403) may determine whether a difference between an enrollment PUF value and an authentication PUF value for a device exceeds a distance threshold.

In act 801, the at least one computer determines a distance using the output values received from the device (e.g., device 401) during evaluation of multiple garbled circuits corresponding to bits in an authentication PUF value. The at least one computer may decrypt the output values into multiple components. In some embodiments, the first component may be a difference between a bit of the enrollment PUF value and a bit of the authentication PUF value. In some embodiments, the at least one computer may be configured to accumulate these differences during garbled circuit evaluation. The at least one computer may be configured to compute a hamming distance, Euclidean distance, or any suitable measure of distance using these accumulated distances.

In act 803, the at least one computer determines whether the computed distance is greater than a maximum distance threshold. When the computed distance is greater than the maximum distance threshold, authentication may fail (e.g., process 800 proceeds to act 811). Otherwise, process 800 proceeds to act 805.

In act 805, the at least one computer determines whether the determined distance is greater than an update distance threshold. The at least one computer may be configured to maintain the update distance threshold as an indication of the aging of the PUF circuitry.

In act 807, when the calculated distance is less than the maximum distance threshold, but greater than the current update distance threshold, the at least one computer sets the update distance threshold equal to the current distance. In this manner, the at least one computer may be configured to track the change in the PUF values generated by the PUF circuitry of the device, as these changes are reflected in an increasing update distance threshold. After adjusting the update distance threshold in act 807, or comparing the calculated distance to the update distance threshold in act 805, process 800 proceeds to act 809.

In act 809, the at least one computer provides an indication to the device that authentication was successful. For example, the at least one computer may provide to the device a ticket or token that the device may use to access services provided by the at least one computer or another device. After completion of act 809, process 800 completes.

In act 811, the at least one computer may provide an indication to the device that authentication was not successful. After completion of act 811, process 800 completes.

In some embodiments, when the update distance threshold becomes sufficiently large (e.g., a threshold of 50 for a 128 bit PUF), the at least one computer may be configured to provide an indication that the enrollment process should be repeated. The enrollment process may be repeated with the same PUF circuitry, or with new PUF circuitry.

In some embodiments, upon successfully completing authentication (e.g., upon completion of act 809), the device and the at least one computer may collaborate to generate new garbled circuits for subsequent authentication of the device, as described above with regard to FIG. 4. The new garbled circuits may use a new PUF value obtained by the device from the PUF circuitry, a new device key, a new computer key, new nonces, new device identifiers, and/or new input keys. As described above, after creation of the new garbled circuits, the at least one computer may delete the enrollment PUF value and any versions of the input keys accessible by the at least one computer. In this manner, the device can be enrolled more than once.

In some embodiments, the maximum threshold distance may be adjusted based on the update distance threshold. In such embodiments, the maximum threshold distance may be chosen to prevent authentication when the distance between the enrollment PUF value and the authentication PUF value changes too much between authentications, or too much within a period of time. For example, after an authentication, the maximum threshold distance may be updated to combine the original maximum threshold distance and some fraction of the update distance threshold. For example, when the maximum threshold value is a distance of 10 for a 128 bit PUF value and the update distance threshold is 4, the maximum threshold value may be adjusted to a value between 11 and 14.

In some examples, the components disclosed herein may read parameters or instructions that affect the functions performed by the components. These parameters or instructions may be physically stored in any form of suitable memory including volatile memory (such as RAM) or nonvolatile memory (such as a magnetic hard drive). In addition, the parameters or instructions may be logically stored in a propriety data structure (such as a database or file defined by a user space application) or in a commonly shared data structure (such as an application registry that is defined by an operating system). In addition, some examples provide for both system and user interfaces that allow external entities to modify the parameters and instructions and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover any one selection from A, B, C (e.g., A), any two selections from A, B, C (e.g., A and B), any three selections (e.g., A, B, C), etc., and any multiple of each selection.

The invention claimed is:

1. At least one computer, comprising:
processing circuitry configured to perform:
providing, to a device using at least one communication network, garbled circuit entries of a garbled circuit, the garbled circuit entries corresponding to potential values of a plurality of bits generated by the device, the garbled circuit entries including a first garbled circuit entry corresponding to a first potential bit value of a first bit of the plurality of bits, the first garbled circuit entry comprising:
    a first input entry comprising a first input key encrypted with a device key associated with the device; and
    a first encrypted output entry comprising a first output entry encrypted with the first input key, wherein the first output entry comprises a first output value corresponding to the first potential bit value of the first bit;
receiving, from the device using the at least one communication network, the first output entry of the garbled circuit;
generating the first output value by decrypting the first output entry using a computer key associated with the at least one computer;
determining whether to authenticate the device using output values, the output values including the first output value; and
providing an indication of the authentication determination to the device.

2. The at least one computer of claim 1, wherein:
providing the garbled circuit entries further comprises:
    providing the first garbled circuit entry corresponding to the first potential bit value of the first bit; and
    providing a second garbled circuit entry corresponding to a second potential bit value of the first bit.

3. The at least one computer of claim 2, wherein:
providing the first garbled circuit entry comprises providing a first value indicating that the first garbled circuit entry corresponds to the first potential bit value.

4. The at least one computer of claim 1, wherein, the first output value comprises a combination of a distance value, a device identifier, and a nonce.

5. The at least one computer of claim 1, wherein:
the output values comprise first device identifiers; and
determining whether to authenticate the device comprises determining whether the first device identifiers match a second device identifier of the device.

6. The at least one computer of claim 1, wherein:
the output values comprise nonces; and
determining whether to authenticate the device comprises determining whether any of the nonces match.

7. The at least one computer of claim 1, wherein:
the output values comprise distance values; and
determining whether to authenticate the device comprises determining whether a sum of the distance values exceeds a maximum distance threshold.

8. The at least one computer of claim 7, wherein:
the distance values depend on bit values of an enrollment PUF value received from the device by the at least one computer during an enrollment process.

9. A device, comprising:
processing circuitry configured to perform:
obtaining a physically unclonable function (PUF) value comprising a plurality of bits representing a digitized value of a signal generated by PUF circuitry coupled to the device; and
for each bit of multiple bits in the plurality of bits:
    receiving, from at least one computer using at least one communication network, garbled circuit entries of a garbled circuit, the garbled circuit entries corresponding to potential values of the bit, each of the garbled circuit entries comprising respective input and encrypted output entries;
    selecting, from among the received garbled circuit entries, a first garbled circuit entry based on a value of the bit, the first garbled circuit entry including a first input entry and a first encrypted output entry, wherein the first encrypted output entry comprises a first output value corresponding to a first potential bit value of the bit;

generating a first input key by decrypting the first input entry using a device key associated with the device;

generating a first output entry by decrypting, using the first input key, the first encrypted output entry; and providing the first output entry to the at least one computer using the at least one communication network.

10. The device of claim 9, wherein:
a structure of the garbled circuit entries indicates a correspondence between the garbled circuit entries and the potential values of the bit; and
the first garbled circuitry entry is selected based on the indicated correspondence.

11. The device of claim 9, wherein:
the first garbled circuitry entry further comprises a value indicating a correspondence between the first garbled circuit entry and the first potential bit value of the bit; and
the first garbled circuitry entry is selected based on the indicated correspondence.

12. The device of claim 9, wherein:
the processing circuitry is configured to further perform:
receiving, from the at least one computer in a first order, garbled circuit entries of garbled circuits corresponding to the multiple bits in the plurality of bits; and
providing, to the at least one computer in a second order differing from the first order, output entries generated from the garbled circuit entries of the garbled circuits.

13. At least one computer, comprising:
processing circuitry configured to perform:
receiving, from a device using at least one communication network, a physically unclonable function (PUF) value comprising a plurality of bits representing a digitized value of a signal generated by PUF circuitry coupled to the device; and
for each bit of multiple bits in the plurality of bits:
creating input values and encrypted output entries for a garbled circuit corresponding to the bit, wherein the encrypted output entries comprise output values corresponding to potential bit values of the bit;
providing, to the device and using the at least one communication network, the input values;
receiving, from the device using the at least one communication network, input entries for the garbled circuit, each input entry comprising one of the input values encrypted with a device key associated with the device; and
storing the input entries in association with the encrypted output entries for the garbled circuit.

14. The at least one computer of claim 13, wherein:
receiving the input entries for the garbled circuit comprises:
receiving a first input entry, the first input entry comprising a first symmetric key encrypted with the device key associated with the device; and
receiving a second input entry, the second input entry comprising a second symmetric key encrypted with the device key associated with the device.

15. The at least one computer of claim 13, wherein:
creating the encrypted output entries for the garbled circuit corresponding to the each one bit comprises:
generating a first output value corresponding to a potential bit value of zero and a second output value corresponding to a potential bit value of one;
encrypting the first output value with a computer key associated with the at least one computer to generate a first output entry and the second output value with the computer key associated with the at least one computer to generate a second output entry; and
encrypting the first output entry with a first input key to generate the encrypted first output entry and the second output entry with a second input key to generate the encrypted second output entry.

16. The at least one computer of claim 15, wherein:
generating the first output value comprises evaluating a function of zero and a value of the bit; and
generating the second output value comprises evaluating a function of one and a value of the bit.

17. The at least one computer of claim 15, wherein:
generating the first value comprises combining a distance value with a device identifier.

18. The at least one computer of claim 15, wherein:
generating the first value comprises combining a distance value with a nonce.

19. The at least one computer of claim 15, wherein:
the processing circuitry is configured to further perform:
deleting the first input key after generating the encrypted first output entries for the garbled circuits corresponding to the multiple bits;
deleting the second input key after generating the encrypted second output entries for the garbled circuits corresponding to the multiple bits; and
deleting the PUF value after generating the first values and the second values for the garbled circuits corresponding to the multiple bits.

20. The at least one computer of claim 13, wherein:
creating the encrypted output entries for the garbled circuit comprises:
generating a first symmetric key and a second symmetric key;
generating a first distance value by performing a logical XOR of a potential bit value of zero and a value of the bit;
generating a second distance value by performing a logical XOR of a potential bit value of one and the value of the bit;
generating a first output value by concatenating the first distance value, an identifier of the device, and a nonce;
generating a second output value by concatenating the second distance value, the identifier of the device, and the nonce;
generating a first output entry by encrypting the first output value using a computer key associated with the at least one computer;
generating a second output entry by encrypting the second output value using the computer key associated with the at least one computer;
generating a first encrypted output entry by encrypting the first output entry using the first symmetric key; and
generating a second encrypted output entry by encrypting the second output entry using the second symmetric key.

* * * * *